3,574,856
METHOD OF PREVENTING AND CONTROLLING COCCIDIOSIS WITH SYDNONE DERIVATIVES

Philip M. Weintraub, Charles O. Baughn, Jr., and Ronald E. Bambury, Ashland, Ohio, assignors to Richardson-Merrell Inc., New York, N.Y.
No Drawing. Filed Oct. 17, 1968, Ser. No. 768,500
Int. Cl. A61k *27/00*
U.S. Cl. 424—263                                    2 Claims

ABSTRACT OF THE DISCLOSURE

The mortality of chicks which become infected with *Eimeria tenella* is reduced when 3-arylsydnones are incorporated in their diets in amounts of from 10 to 400 parts per million by weight. Compositions containing these 3-arylsydnones and methods of using them in preventing and controlling coccidiosis are disclosed.

---

This invention relates to a new composition of matter and to a method of using it in preventing or controlling coccidiosis in animals, particularly poultry such as chickens and turkeys. More particularly, the present invention resides in the discovery that certain compositions containing 3-arylsydnones are effective anticoccidials at low dosage levels.

Coccidiosis is generally caused by protozoa belonging to the family Eimeriidae of the order Eucoccidiida of the subclass coccidia. The majority of the species are parasites of the epithelium of the alimentary tract. Although for many years coccidiosis has been recognized as one of the most important diseases confronting the poultry industry, no entirely satisfactory method of control of the disease has been provided. This is evidenced by the fact that losses in the United States due to poultry coccidia are estimated to exceed forty million dollars annually. Coccidiosis is also an important disease of sheep, goats, cattle, rabbits, and other animals. Because drug resistance, or the possibility of drug resistance, is becoming increasingly common and occurs with the majority of coccidiostats after a certain number of years, it is essential that new and potent coccidiostats be developed.

The novel compositions of this invention which are useful for combating and controlling coccidiosis in animals contain about 10 to 400 p.p.m. by weight of a 3-arylsydnone having the formula:

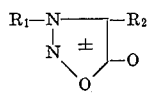

Sydnones in which $R_1$ is phenyl or pyridyl have been found to be particularly effective. The phenyl radical may bear one or more substituents of the group consisting of hydrogen, lower alkyl, lower alkoxy, carboxy, halogen, nitro, hydroxy, and acetyl, and $R_2$ is a member of the group consisting of hydrogen, lower alkyl, and acetyl as will be seen from the experimental results which are shown below.

The coccidiostatic activity of the compositions is evidenced by the large reduction or elimination of mortality of the animals, of lesions, and the presence of blood in the excrements of the animals.

The 3-arylsydnones which have been found useful in this invention can be administered to the animals in any ingestible form. They can be incorporated into the animals' drinking water or into supplements (premixes) which contain a relatively large percentage of the coccidiostat, in the form of pastes, small balls, tablets, granules, drinkable solutions, or oral powders which contain one or more additional products or non-toxic additives. These supplements are then uniformly distributed in the finished animal feed either directly or after an intermediate processing step. The feed supplements are prepared by adding the subject compound to a suitable carrier and mixing for sufficient time to give a substantially uniform dispersion of the coccidiostat in the carrier. The carrier, or diluent, is a solid edible material that is inert with respect to the subject compounds and may be administered with safety to the animals to be treated. Examples of such carriers are distillers grains, corn meal, ground oyster shells, attapulgus clay, molasses solubles, antibiotic mycelia, soybean grits, soybean feed, soybean meal, crushed limestone, et cetera.

These active anticoccidials may be combined with other anticoccidials such as sulfonamides and antibiotics or with feed additives such as the vitamins and other growth supplements.

As illustrative of the anticoccidial compositions of the present invention a large number of 3-arylsydnones were evaluated at various dosage levels as anticoccidial agents by administering the drug in a chick feed of the following composition:

|  | Pounds |
|---|---:|
| Salt | 10 |
| Calcium Carbonate | 15 |
| Feed Builder | 25 |
| Dry Whey | 30 |
| 60% Fish Meal | 50 |
| 41% Corn Gluten Meal | 100 |
| 50% Meat and Bone Scraps | 100 |
| 50% Soybean Oil Meal | 450 |
| Ground Corn | 1150 |
| Oil Press Cake | 20 |

The feed builder in the formulation was a proprietary mixture of vitamins, amino acids, trace elements, minerals, dicalcium phosphate, and calcium carbonate. The oil press cake is a by-product of recovering oils from vegetable seeds which material provides a cheap source of fat. To this chick feed formulation was added with thorough mixing a 3-arylsydnone in amounts and of the kind shown in the table which follows.

The procedure for determining anticoccidial activity of the 3-arylsydnones involved dividing a number of two-week old white Leghorn cockerels into pens of twenty (20) chicks per pen. Some pens served as a non-infected untreated control. Other pens served as infected untreated controls, and still other pens were provided with a drug of known potency commencing on the day of infection. Each chick, except the appropriate controls, was infected with approximately 100,000 oocysts of *Eimeria tenella* by oral administration. All groups were given free access to the basal diet commencing on the day of infection. As indicated in the table below, the basal diet of some groups contained a 3-arylsydnone in varrying amounts. Medication continued for eight days following infection. In 300 untreated infected controls, the observed mortality was about 80 percent with the mean survival time of those chicks that died being about five days after infection. Activity of the mixtures tested was determined at the conclusion of the test on the basis of a significant number of survivals in the treated group in comparison with untreated infected controls. A summary of the results obtained with a large number of 3-arylsydnones is shown in the following table.

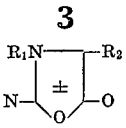

| $R_1$ | $R_2$ | Percent compound in diet | Number of birds treated | Percent survivors |
|---|---|---|---|---|
| $C_6H_5$ | H | 0.033 | 120 | 83 |
|  |  | 0.0165 | 80 | 74 |
|  |  | 0.00825 | 20 | 40 |
| 4-$ClC_6H_4$ | H | 0.033 | 80 | 87 |
|  |  | 0.0165 | 40 | 50 |
|  |  | 0.00825 | 40 | 12 |
| 4-$FC_6H_4$ | H | 0.033 | 20 | 95 |
|  |  | 0.0165 | 20 | 45 |
| 4-$CH_3OC_6H_4$ | H | 0.033 | 20 | 65 |
|  |  | 0.0165 | 20 | 35 |
| 3-$CH_3C_6H_4$ | H | 0.033 | 20 | 50 |
| 3-$CH_3OC_6H_4$ | H | 0.033 | 20 | 95 |
| 4-$HO_2CC_6H_4$ | H | 0.033 | 20 | 25 |
| 4-$CH_3$-3-$NO_2C_6H_3$ | H | 0.033 | 20 | 65 |
| 4-$CH_3O$-3-$NO_2C_6H_3$ | H | 0.033 | 20 | 85 |
| 3-$C_5H_4N$ | H | 0.033 | 20 | 45 |
|  |  | 0.011 | 1 | 20 |
|  |  | 0.0055 | 10 | 20 |
| $C_6H_5$ | $C_2H_5$ | 0.033 | 20 | 45 |
|  |  | 0.0165 | 20 | 40 |
| $C_6H_5$ | Br | 0.033 | 20 | 70 |
|  |  | 0.0165 | 20 | 35 |
| $C_6H_5$ | I | 0.033 | 20 | 65 |
|  |  | 0.0165 | 20 | 25 |
| $C_6H_5$ | $CH_3CO$ | 0.033 | 20 | 85 |
| 4-$CH_3OC_6H_4$ | $CH_3CO$ | 0.033 | 20 | 35 |
| Infected controls |  |  | 280 | 21 |
| Non-infected controls |  |  | 220 | 100 |

What is claimed is:

1. A method of controlling coccidiosis in animals which comprises administering to animals, subject to infection with protozoa of the family Emeriidae, in their diet 10 to 400 parts by weight for each million parts by weight of said diet a 3-arylsydnone of the formula

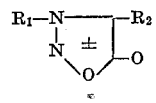

in which $R_1$ is a phenyl radical bearing in the 3 or 4 position at least one substituent from the group consisting of hydrogen, lower alkyl of 1–3 carbons, lower alkoxy of 1–3 carbons, carboxy, halogen, nitro, hydroxy and acetyl, or a pyridyl radical and $R_2$ is a member of the group consisting of hydrogen, lower alkyl of 1–3 carbons, and acetyl.

2. A method in accordance with claim 1 in which the animals are chickens and the protozoa is *Eimeria tenella*.

References Cited

UNITED STATES PATENTS 3,224,937  12/1965  Wiley _____ 424—272
3,189,520  6/1965  Rogers et al. _____ 424—272

OTHER REFERENCES

Oehme et al., Chem. Abst., vol. 63 (1965) page 6191g.

SAM ROSEN, Primary Examiner

U.S. Cl. X.R.

260—290, 307; 424—272